(12) United States Patent
Jain et al.

(10) Patent No.: US 11,086,818 B2
(45) Date of Patent: Aug. 10, 2021

(54) ESTABLISHING OBJECT ATOMICITY IN SNAPSHOT BASED DISASTER RECOVERY ENVIRONMENTS

(71) Applicant: International Business Machines Corporation, Armonk, NY (US)

(72) Inventors: Abhishek Jain, Baraut (IN); Abhishek S. Dave, Pune (IN); Sasikanth Eda, Vijayawada (IN); Anil L. Palled, Pune (IN)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 16/130,852

(22) Filed: Sep. 13, 2018

(65) Prior Publication Data

US 2020/0089782 A1 Mar. 19, 2020

(51) Int. Cl.
*G06F 17/30* (2006.01)
*G06F 16/11* (2019.01)
(Continued)

(52) U.S. Cl.
CPC ........ *G06F 16/128* (2019.01); *G06F 11/1464* (2013.01); *G06F 16/1824* (2019.01); *G06F 16/27* (2019.01)

(58) Field of Classification Search
CPC .... G06F 16/128; G06F 16/27; G06F 16/1824; G06F 11/1464
See application file for complete search history.

(56) References Cited

U.S. PATENT DOCUMENTS

| 8,768,977 B2 * | 7/2014 | Golab | G06F 16/27 |
| | | | 707/806 |
| 9,244,967 B2 | 1/2016 | Provenzano et al. | |

(Continued)

FOREIGN PATENT DOCUMENTS

WO 2017147101 A1 8/2017

OTHER PUBLICATIONS

IBM, "Introduction to Active File Management (AFM)," IBM Knowledge Center, retrieved on Sep. 8, 2018, from https://www.ibm.com/support/knowledgecenter/STXKQY_5.0.0/com.ibm.spectrum.scale.v5r00.doc/bl1ins_introafm.htm, pp. 1-4.
(Continued)

*Primary Examiner* — Huawen A Peng
(74) *Attorney, Agent, or Firm* — Zilka-Kotab, P.C.

(57) ABSTRACT

A computer-implemented method, according to one embodiment, includes: capturing a snapshot of data stored at a primary storage location, and determining a transaction identification which corresponds to each file operation included in the snapshot, where each file operation includes a respective number of sub-operations. Data included in the snapshot which corresponds to completed ones of the sub-operations is identified, and the determined transaction identifications as well as the identified data is used to populate entries in a data structure. The snapshot is sent to a secondary storage location, and an acknowledgement is received from the secondary storage location for each of the completed sub-operations that are successfully performed at the secondary storage location. Furthermore, the data structure is updated based on the received acknowledgements.

20 Claims, 10 Drawing Sheets

(51) Int. Cl.
  *G06F 11/14* (2006.01)
  *G06F 16/27* (2019.01)
  *G06F 16/182* (2019.01)

(56) References Cited

U.S. PATENT DOCUMENTS

| | | | |
|---|---|---|---|
| 9,811,430 B1 | 11/2017 | Bezbaruah et al. | |
| 9,990,401 B2* | 6/2018 | Toillion | B29D 30/0681 |
| 10,592,128 B1* | 3/2020 | Natanzon | G06F 11/1456 |
| 10,733,053 B1* | 8/2020 | Miller | G06F 11/1088 |
| 2009/0063698 A1 | 3/2009 | Xu et al. | |
| 2012/0311490 A1* | 12/2012 | Ammon | G06F 9/451 |
| | | | 715/804 |
| 2013/0036091 A1* | 2/2013 | Provenzano | G06F 16/1844 |
| | | | 707/624 |
| 2014/0040206 A1 | 2/2014 | Ramakrishnan et al. | |
| 2015/0212897 A1* | 7/2015 | Kottomtharayil | G06F 11/00 |
| | | | 714/20 |
| 2015/0278281 A1* | 10/2015 | Zhang | G06F 16/2379 |
| | | | 707/703 |
| 2016/0275089 A1* | 9/2016 | Soundararajan | G06F 16/18 |
| 2017/0351667 A1* | 12/2017 | Nie | G06F 16/2308 |
| 2017/0357659 A1* | 12/2017 | Mackovitch | G06F 11/1446 |
| 2018/0157561 A1* | 6/2018 | Venkatesh | G06F 8/65 |
| 2018/0173562 A1* | 6/2018 | Chen | G06F 11/3006 |

OTHER PUBLICATIONS

IBM, "Cache and Home," IBM Knowledge Center, retrieved on Sep. 8, 2018, from https://www.ibm.com/support/knowledgecenter/STXKQY_5.0.0/com.ibm.spectrum.scale.v5r00.doc/bl1ins_cacheandhomeAFM.htm, pp. 1-3.

IBM, "AFM-based Asynchronous Disaster Recovery (AFM DR)," IBM Knowledge Center, retrieved on Sep. 8, 2018, from https://www.ibm.com/support/knowledgecenter/en/STXKQY_5.0.0/com.ibm.spectrum.scale.v5r00.doc,/bl1ins_introductionafmdr.htm, pp. 1-4.

OpenStack, "Swift Architectural Overview," OpenStack, retrieved on Sep. 8, 2018, from https://docs.openstack.org/swift/latest/overview_architecture.html, pp. 1-5.

OpenStack, "Welcome to Swift's documentation!" OpenStack, retrieved on Sep. 8, 2018, from http://docs.openstack.org/developer/swift/overview_ring.html, pp. 1-6.

* cited by examiner

ESTABLISHING OBJECT ATOMICITY IN SNAPSHOT BASED DISASTER RECOVERY ENVIRONMENTS

BACKGROUND

The present invention relates to data storage systems, and more specifically, this invention relates to the management and transfer of data between sites in a data storage system.

A clustered filesystem is a filesystem which is shared by being simultaneously mounted on multiple servers. Accordingly, clustered filesystems are somewhat insulated from experiencing data loss following disaster situations in which one of the multiple servers fail, and are therefore often utilized for data retention purposes.

For example, snapshot-based asynchronous disaster recovery architectures include a primary site and a secondary site. An initial snapshot taken at the primary site is passed to the secondary site, after which incremental snapshots of the primary site are transferred to the secondary site. The primary site often functions as a read-writeable fileset which is able to host applications that are given read/write access to the data stored therein. It follows that the data stored in the primary site is asynchronously replicated to the secondary site. Moreover, a recovery point objective (RPO) setting allows for the frequency at which the incremental snapshots are taken to be specified.

Conventional implementations of snapshot-based disaster recovery architectures are effective in the situations involving simple file workloads where the atomicity of operations is limited to a single file and/or has no other dependencies. However, these conventional implementations have failed to operate successfully in situations involving object workloads which have numerous file operations linked with each other to represent the state of objects. For instance, in situations which involve Mode changes or the same Mode with different paths, intermediate stages of object transactions can be captured as part of an incremental snapshot and replayed at secondary site, thereby leading to object corruption. Thus, if the primary site fails for any reason, the secondary site only contains partial data of various objects and is corrupted upon becoming active in response to the primary site failure.

SUMMARY

A computer-implemented method, according to one embodiment, includes: capturing a snapshot of data stored at a primary storage location, and determining a transaction identification which corresponds to each file operation included in the snapshot, where each file operation includes a respective number of sub-operations. Data included in the snapshot which corresponds to completed ones of the sub-operations is identified, and the determined transaction identifications as well as the identified data is used to populate entries in a data structure. The snapshot is sent to a secondary storage location, and an acknowledgement is received from the secondary storage location for each of the completed sub-operations that are successfully performed at the secondary storage location. Furthermore, the data structure is updated based on the received acknowledgments.

A computer program product, according to another embodiment, includes a computer readable storage medium having program instructions embodied therewith. The computer readable storage medium is not a transitory signal per se. Moreover, the program instructions are readable and/or executable by a controller to cause the controller to perform a method which includes: capturing, by the controller, a snapshot of data stored at a primary storage location; and determining, by the controller, a transaction identification which corresponds to each file operation included in the snapshot, where each file operation includes a respective number of sub-operations. Data included in the snapshot which corresponds to completed ones of the sub-operations is identified by the controller; and the determined transaction identifications as well as the identified data is used, by the controller, to populate entries in a data structure. The snapshot is sent, by the controller, to a secondary storage location, and an acknowledgement is received, by the controller, from the secondary storage location for each of the completed sub-operations that are successfully performed at the secondary storage location. Furthermore, the data structure is updated, by the controller, based on the received acknowledgements.

A system, according to yet another embodiment, includes: a processor; and logic integrated with the processor, executable by the processor, or integrated with and executable by the processor. The logic is configured to: capture, by the processor, a snapshot of data stored at a primary storage location; and determine, by the processor, a transaction identification which corresponds to each file operation included in the snapshot, where each file operation includes a respective number of sub-operations. Data included in the snapshot which corresponds to completed ones of the sub-operations is identified, by the processor; and the determined transaction identifications as well as the identified data is used, by the processor, to populate entries in a data structure. The snapshot is sent, by the processor, to a secondary storage location; and an acknowledgement is received, by the processor, from the secondary storage location for each of the completed sub-operations that are successfully performed at the secondary storage location. Furthermore, the data structure is updated, by the processor, based on the received acknowledgements.

Other aspects and embodiments of the present invention will become apparent from the following detailed description, which, when taken in conjunction with the drawings, illustrate by way of example the principles of the invention.

DETAILED DESCRIPTION

Figure 1:
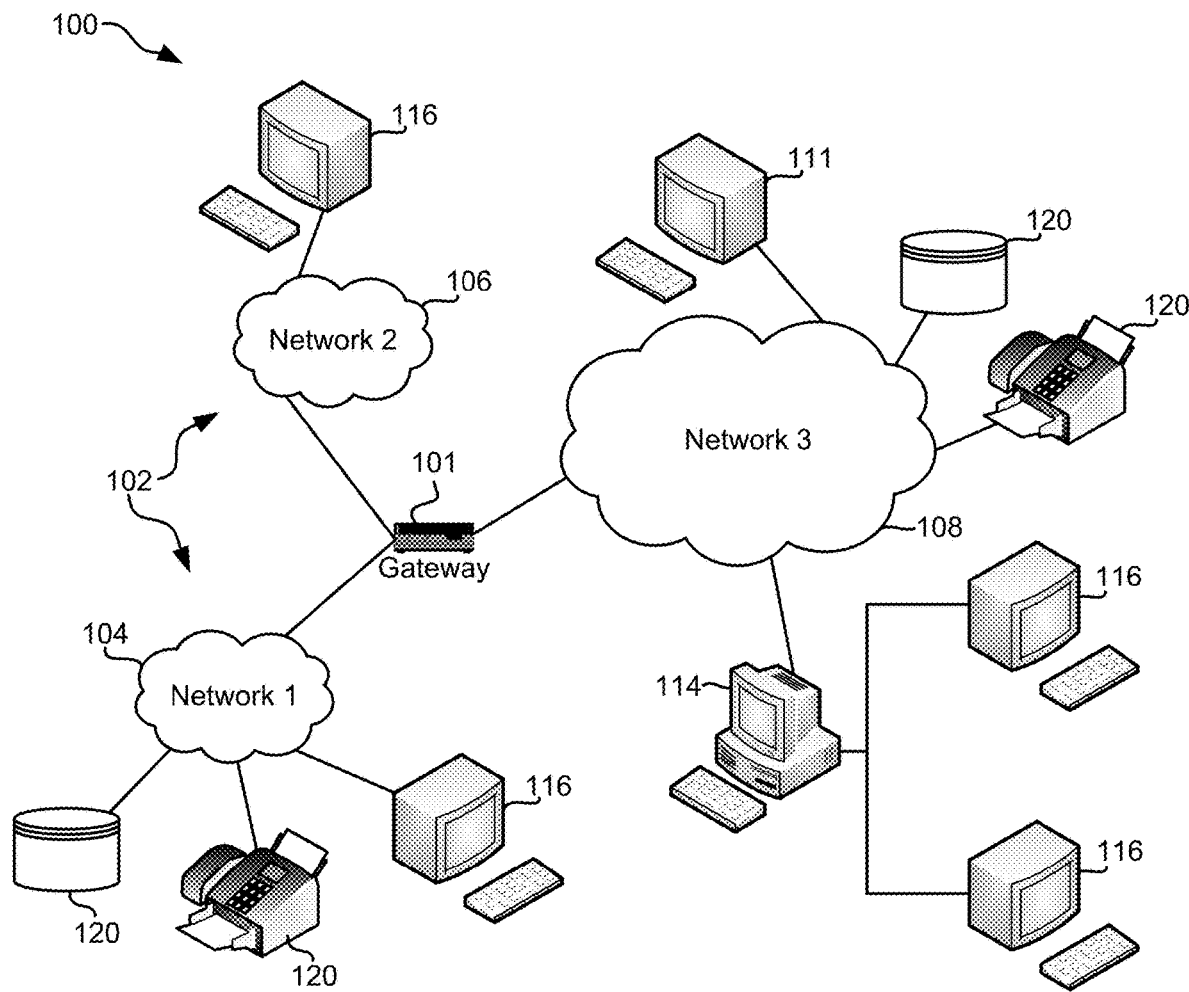
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products which are able to significantly improve the efficiency and consistency at which storage environments implementing WAN caching and/or object-based workloads are able to operate. Some of the embodiments included herein are able to achieve this improved performance by forming a data structure which improves the process of implementing sub-operations at a secondary storage location while also marking inconsistencies of objects if any of the sub-operations corresponding to a given file operation are lost, e.g., due to in network issues such as latency, as will be described in further detail below.

In one general embodiment, a computer-implemented method includes: capturing a snapshot of data stored at a primary storage location, and determining a transaction identification which corresponds to each file operation included in the snapshot, where each file operation includes a respective number of sub-operations. Data included in the snapshot which corresponds to completed ones of the sub-operations is identified, and the determined transaction identifications as well as the identified data is used to populate entries in a data structure. The snapshot is sent to a secondary storage location, and an acknowledgement is received from the secondary storage location for each of the completed sub-operations that are successfully performed at the secondary storage location. Furthermore, the data structure is updated based on the received acknowledgements.

In another general embodiment, a computer program product includes a computer readable storage medium having program instructions embodied therewith. The computer readable storage medium is not a transitory signal per se. Moreover, the program instructions are readable and/or executable by a controller to cause the controller to perform a method which includes: capturing, by the controller, a snapshot of data stored at a primary storage location; and determining, by the controller, a transaction identification which corresponds to each file operation included in the snapshot, where each file operation includes a respective number of sub-operations. Data included in the snapshot which corresponds to completed ones of the sub-operations is identified by the controller; and the determined transaction identifications as well as the identified data is used, by the controller, to populate entries in a data structure. The snapshot is sent, by the controller, to a secondary storage location, and an acknowledgement is received, by the controller, from the secondary storage location for each of the completed sub-operations that are successfully performed at the secondary storage location. Furthermore, the data structure is updated, by the controller, based on the received acknowledgements.

In yet another general embodiment, a system includes: a processor; and logic integrated with the processor, executable by the processor, or integrated with and executable by the processor. The logic is configured to: capture, by the processor, a snapshot of data stored at a primary storage location; and determine, by the processor, a transaction identification which corresponds to each file operation included in the snapshot, where each file operation includes a respective number of sub-operations. Data included in the snapshot which corresponds to completed ones of the sub-operations is identified, by the processor; and the determined transaction identifications as well as the identified data is used, by the processor, to populate entries in a data structure. The snapshot is sent, by the processor, to a secondary storage location; and an acknowledgement is received, by the processor, from the secondary storage location for each of the completed sub-operations that are successfully performed at the secondary storage location. Furthermore, the data structure is updated, by the processor, based on the received acknowledgements.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
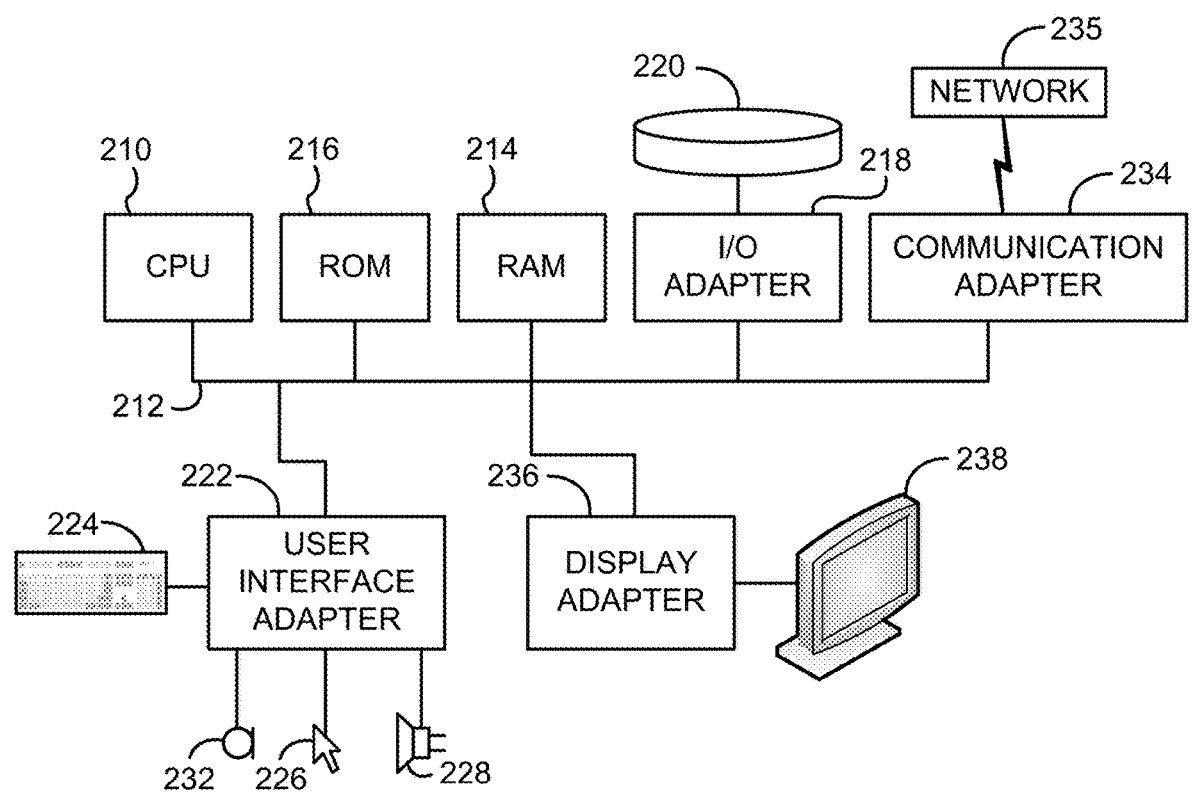
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
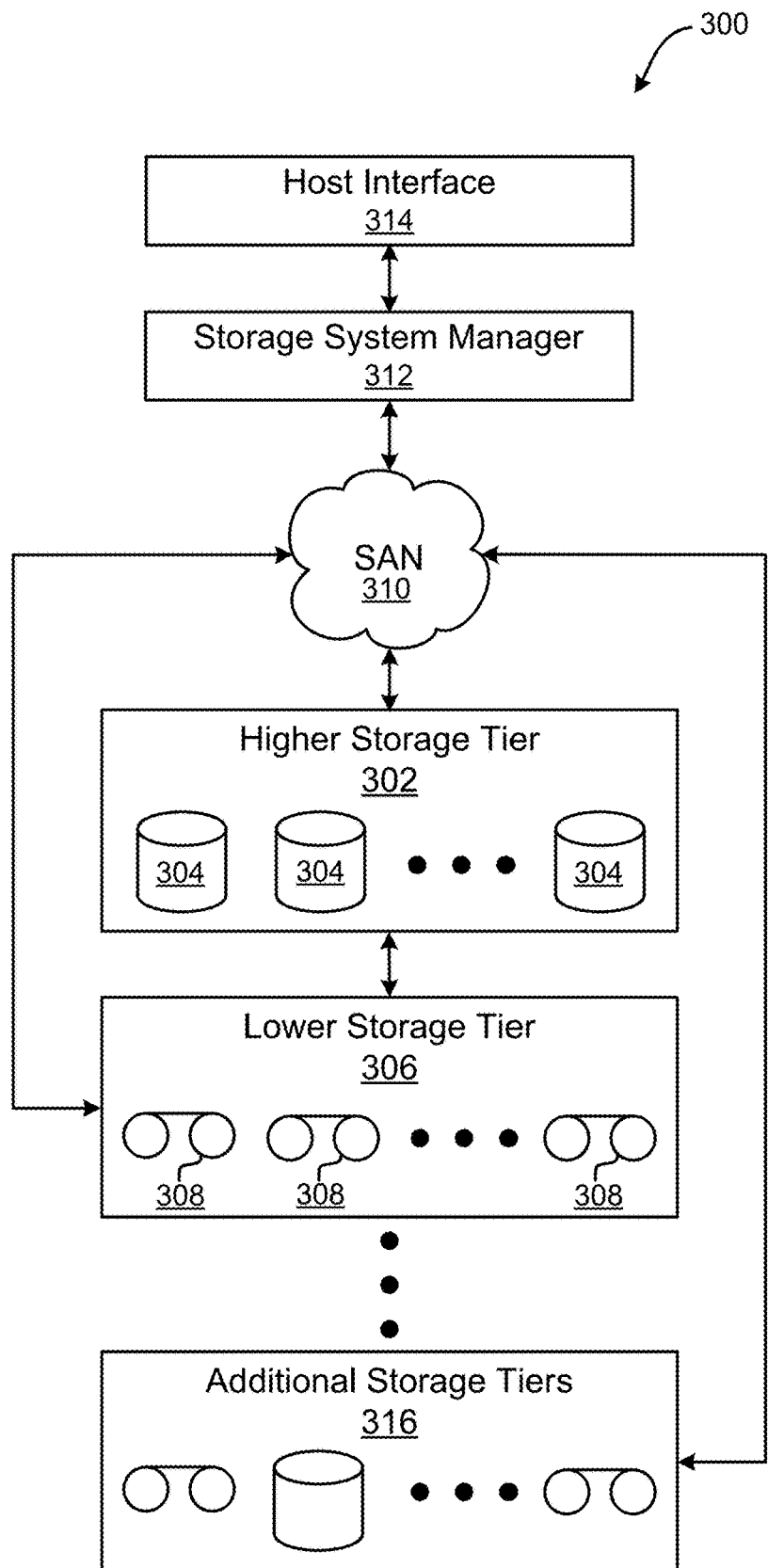
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned above, snapshot-based asynchronous disaster recovery architectures are utilized in order to avoid data loss in disaster situations. This has been conventionally implemented by taking an initial snapshot at a primary site, which is then passed to a removed secondary site. After the initial snapshot, incremental snapshots of the primary site are transferred to the secondary site. The primary site often functions as a read-writeable fileset which is able to host applications that are given read/write access to the data stored therein. It follows that the data stored in the primary site is asynchronously replicated to the secondary site.

While these conventional implementations of snapshot-based disaster recovery architectures are effective in the situations involving simple file workloads where the atomicity of operations is limited to a single file and/or has no other dependencies, they have failed to operate successfully in situations involving object workloads which have numerous file operations linked with each other to represent the state of objects. For instance, in situations in which an incremental snapshot "snap-A" is executed during an intermediary step of object creation at a primary site and is successfully replayed at a secondary site. Accordingly, the secondary site only has partial content of the object. Moreover, assuming that a network packet is lost and/or corrupted such that a subsequent incremental snapshot "snap-B" holding the remainder of the changes related to the given object is lost, at least two significant inconsistency states will arise.

First, in a strict consistency case, the secondary site requests that the identified corrupted snapshot "snap-B" retried (e.g., reattempted), thereby resulting in network wastage, slowing down the entire backup process. Secondly, in a non-strict consistency case, the incremental snapshot "snap-C" taken in a next cycle is successfully received and replayed at the secondary site. However, the intermediate changes (e.g., such as temporary file and/or object file with no container entry) replayed via "snap-A" still reside on the cluster, and thereby consume unnecessary space. As a result, a reconciler is needed in order to remove any such unnecessary data, which undesirably consumes a significant amount of CPU resources, memory, etc. Further still, even after declaring "snap-B" as being corrupted, if the primary site experiences an outage which causes applications to switch to the secondary site, there exists no single place in to compare the partial and full content objects, thereby also resulting in application corruption.

In sharp contrast to the foregoing shortcomings experienced by conventional implementations, various ones of the embodiments included herein are able to understand the correlation between the operations which correspond to a given object, and acknowledge the replay of such operations at a secondary site on a per object basis. Moreover, some of the embodiments included herein provide a single point of view for determining transfer of partial content and/or full content. Accordingly, an object can be identified at the secondary site as being inconsistent even if one of the many possible operations corresponding to the given object is lost, e.g., due to network delays. As a result, the embodiments included herein are able to improve the efficiency and consistency at which storage environments implementing snapshot based disaster recovery and/or object-based workloads are able to operate. Some of the embodiments included herein are able to achieve this improved performance by maintaining an updated data structure which retains the operations captured in various snapshots with respect to the actual state of the corresponding objects. As a result, data retention, sustained system operation, operating efficiency, etc. are significantly improved, e.g., as will be described in further detail below.

Figure 4:
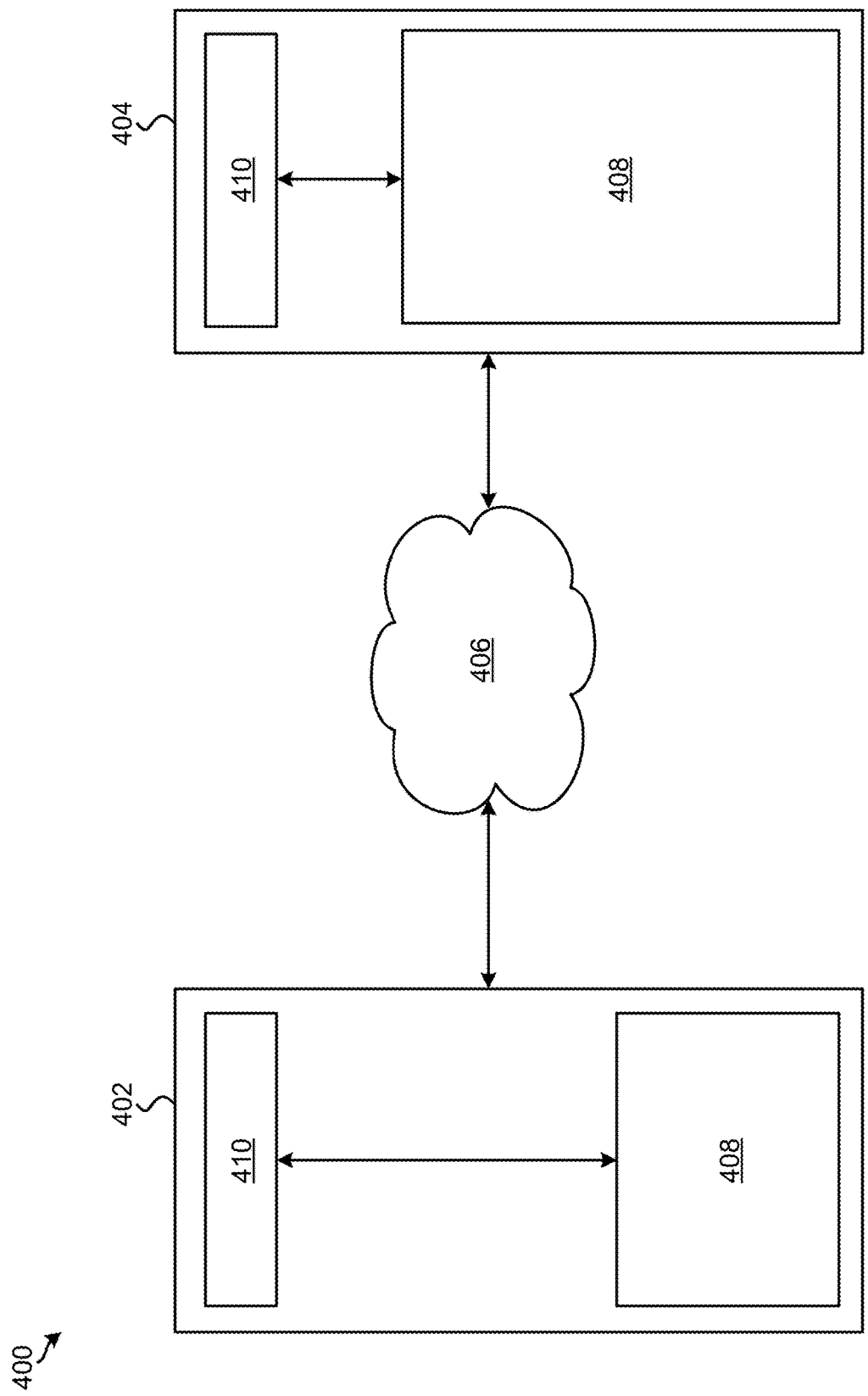
FIG. 4 is a partial representative view of a distributed data storage system in accordance with one embodiment.

Looking to FIG. 4, a distributed data storage system 400 is illustrated in accordance with one embodiment. As an option, the present data storage system 400 may be implemented in conjunction with features from any other embodiment listed herein, such as those described with reference to the other FIGS. However, such data storage system 400 and others presented herein may be used in various applications and/or in permutations which may or may not be specifically described in the illustrative embodiments listed herein. Further, the data storage system 400 presented herein may be used in any desired environment. Thus FIG. 4 (and the other FIGS.) may be deemed to include any possible permutation.

As shown, the data storage system 400 includes a first storage location 402 and a second storage location 404 which are connected by a network 406. According to preferred approaches, the first storage location 402 and the second storage location 404 each include data storage components 408 (e.g., memory) which are configured as object-based filesystems. In other words, the first and second storage locations 402, 404 preferably include object-based filesystems which may be used to implement object storage. Accordingly, the various objects are stored as binary files on the object-based filesystem, e.g., as would be appreciated by one skilled in the art after reading the present description. Moreover, a controller (e.g., processor) 410 is included in each of the first and second storage locations 402, 404, each of the controllers 410 being electrically coupled to the respective storage components 408. The controllers 410 at the first and second storage locations 402, 404 may also be able to communicate with each other (e.g., send data, commands, requests, etc. to each other) using a connection to network 406.

The network 406 connecting the first and second storage locations 402, 404 may be a WAN according to some approaches. However, the network 406 may include any desired type of network, e.g., such as a LAN, a SAN, a personal area network (PAN), etc., e.g., depending on the approach. For instance, the type of network 406 used to connect the first and second storage locations 402, 404 may depend on the distance separating the storage locations. According to some approaches, the first and second storage locations 402, 404 may be geographically separated by any amount of distance.

As described above, snapshot-based asynchronous disaster recovery architectures implement a primary site (also referred to herein as a "primary storage location") and a secondary site (also referred to herein as a "secondary storage location"), the two sites being able to transfer data therebetween. For instance, snapshots are incrementally taken at the primary storage location and then passed (e.g., asynchronously replicated) to the removed secondary site for redundant storage. Accordingly, the first storage location 402 functions as a "primary storage location", while the second storage location 404 serves as a "secondary storage location" in preferred approaches. However, this is in no way intended to be limiting. For example, in other approaches the first storage location 402 may function as the "secondary storage location", while the second storage location 404 serves as the "primary storage location."

Furthermore, although FIG. 4 only depicts a single primary storage location connected to a single secondary site, the distributed data storage system 400 may include additional storage sites coupled to the sites depicted in the present embodiment. Thus, the second storage location 404 includes a storage component 408 (e.g., memory) having a larger storage capacity than the storage component 408 included in the first storage location 402. As operations are performed at the first storage location 402, they are incrementally re-performed at the second storage location 404 over time using network 406. Accordingly, the controllers 410 may implement various processes of snapshot based disaster recovery procedures, e.g., as described below with respect to method 500.

Figure 5A:
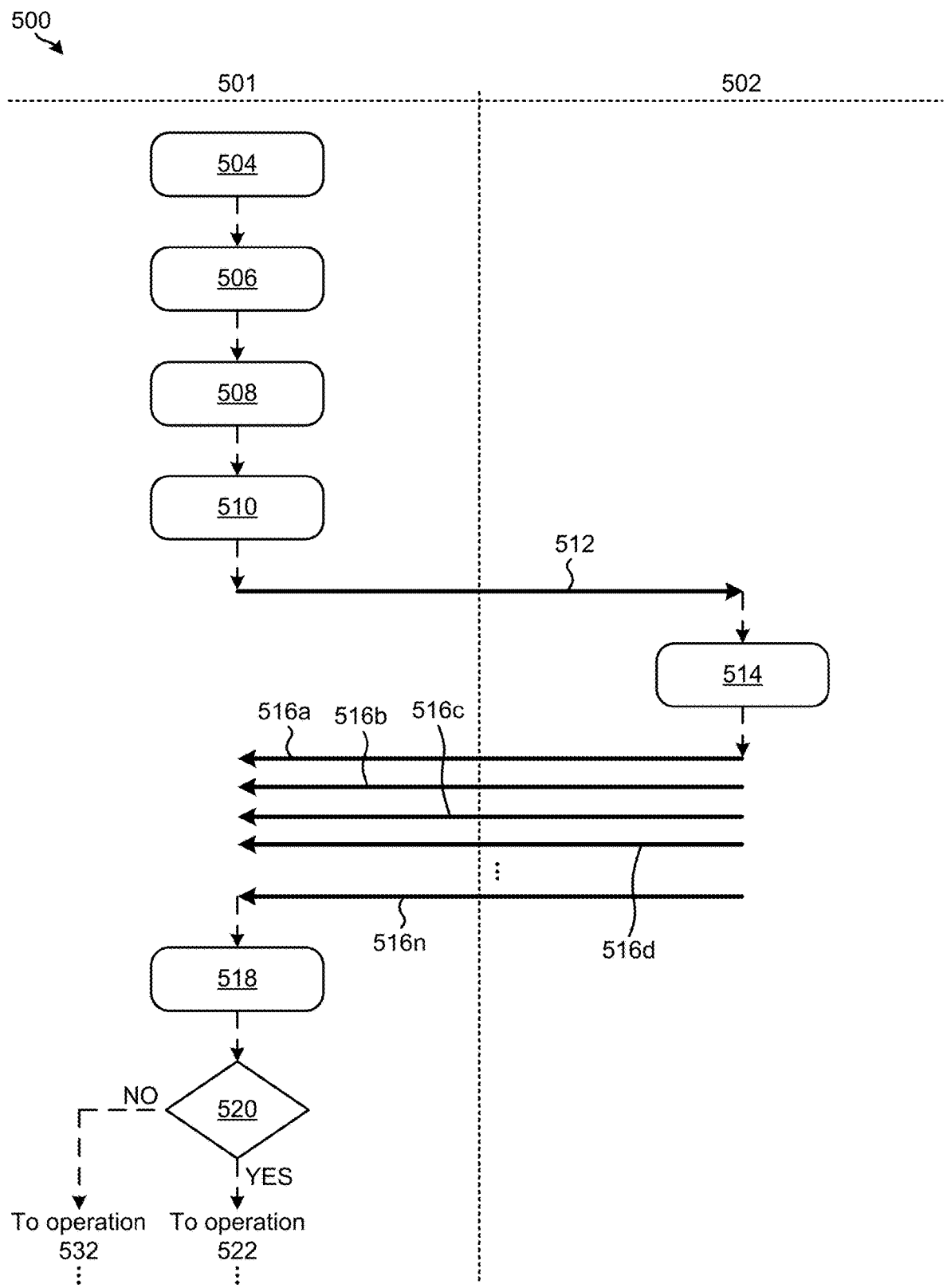
FIG. 5A is a flowchart of a method in accordance with one embodiment.
Figure 5A:
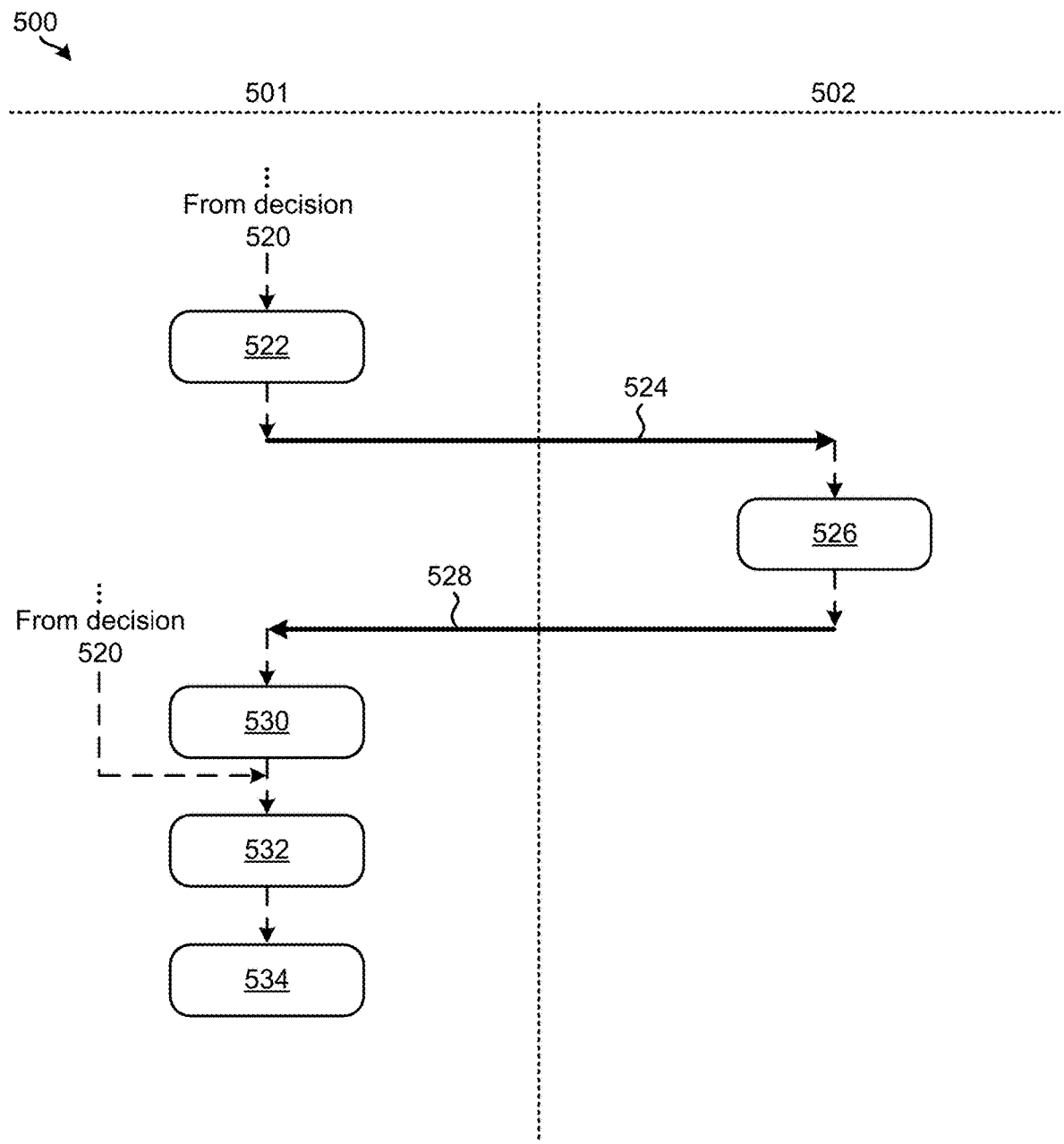

Now referring to FIG. 5A, a flowchart of a computer-implemented method 500 is shown according to one embodiment. The method 500 may be performed in accordance with the present invention in any of the environments depicted in FIGS. 1-4, among others, in various embodiments. Of course, more or less operations than those specifically described in FIG. 5A may be included in method 500, as would be understood by one of skill in the art upon reading the present descriptions.

Each of the steps of the method 500 may be performed by any suitable component of the operating environment. For example, each of the nodes 501, 502 shown in the flowchart of method 500 may correspond to one or more processors positioned at a different location in a multi-tiered data storage system. Moreover, each of the one or more processors are preferably configured to communicate with each other.

In various embodiments, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 5A includes different nodes 501, 502, each of which represent one or more processors, controllers, computer, etc., positioned at a different location in a multi-tiered data storage system. For instance, node 501 may include one or more processors which are electrically coupled to a primary storage location of a distributed data storage system (e.g., see controller 410 in first storage location 402 of FIG. 4 above). Node 502 may include one or more processors which are electrically coupled to a secondary storage location of a distributed data storage system (e.g., see controller 410 in second storage location 404 of FIG. 4 above). Furthermore, nodes 501 and 502 are preferably able to communicate with each other through a network. Accordingly, commands, data, requests, etc. may be sent between each of the nodes 501, 502 depending on the approach. Moreover, it should be noted that the various processes included in method 500 are in no way intended to be limiting, e.g., as would be appreciated by one skilled in the art after reading the present description. For instance, data sent from node 502 to node 501 may be prefaced by a request sent from node 501 to node 502 in some approaches.

As shown, operation 504 of method 500 is performed at node 501 and includes capturing a snapshot of data stored at a primary storage location. In some approaches the snapshot captured in operation 504 may be an initial snapshot which represents the initial state of the data stored at the primary storage location. Yet, in other approaches the snapshot captured in operation 504 may be an update to a previously captured initial snapshot, thereby representing any changes to the data stored at the primary storage location. The frequency, number, etc. of snapshots which are taken of a primary storage location varies depending on the approach. For instance, RPO and/or recovery target objective (RTO) settings may specify the frequency at which incremental snapshots of the primary storage location are taken. Moreover, RPO and/or RTO information may be derived from user configuration data, e.g., as would be appreciated by one skilled in the art after reading the present description.

Each of the file operations included in the snapshot has a specific type. For instance, a file operation may include a "PUT" or "CREATE" command, an "UPDATE" command, a "POST" command, a "DELETE" command, etc. Moreover, each of the operations further include a respective number of sub-operations which correspond to the type of operation. Certain types of file operations may also have sub-operations which correspond to predefined templates associated therewith. In other words, a template which specifies a certain number and/or order of sub-operations to be performed for a given object-based operation may be predefined for certain types of file operations that are included in the snapshot. Such templates may be predefined by a user, a controller, industry standards, etc. Moreover, the sub-operations included in a given prespecified template may be limited to a single Mode, or may correspond to more than one different Modes, depending on the approach.

However, it should be noted that not all operations correspond to a predefined template. Accordingly, each of the operations included in the snapshot are evaluated in some approaches to determine whether they correspond to a predefined template. This determination may be made, at least in part, by evaluating a list of predefined templates which are supported. In some approaches a lookup table which includes each of the supported predefined templates may be stored in memory and maintained. In response to determining that a file operation does not correspond to a predefined template given operation may be processed "nominally". In other words, the given operation is treated as a normal file operation which does not have any specific order and/or number of sub-operations linked thereto, e.g., as would be appreciated by one skilled in the art after reading the present description.

Operation 506 further includes determining a transaction ID which corresponds to each file operation included in the snapshot captured in operation 506. A transaction ID may be used in the process of creating and/or updating a data structure which corresponds to the current status of various object-based operations throughout the distributed storage system. As mentioned above, this desirably leads to significant improvements in the efficiency and consistency by which the distributed storage system implementing method 500 is able to operate. Moreover, in some approaches a stage of each of the respective object-based operations can be determined using the data included in the snapshot, e.g., as will be described in further detail below.

Figure 5B:
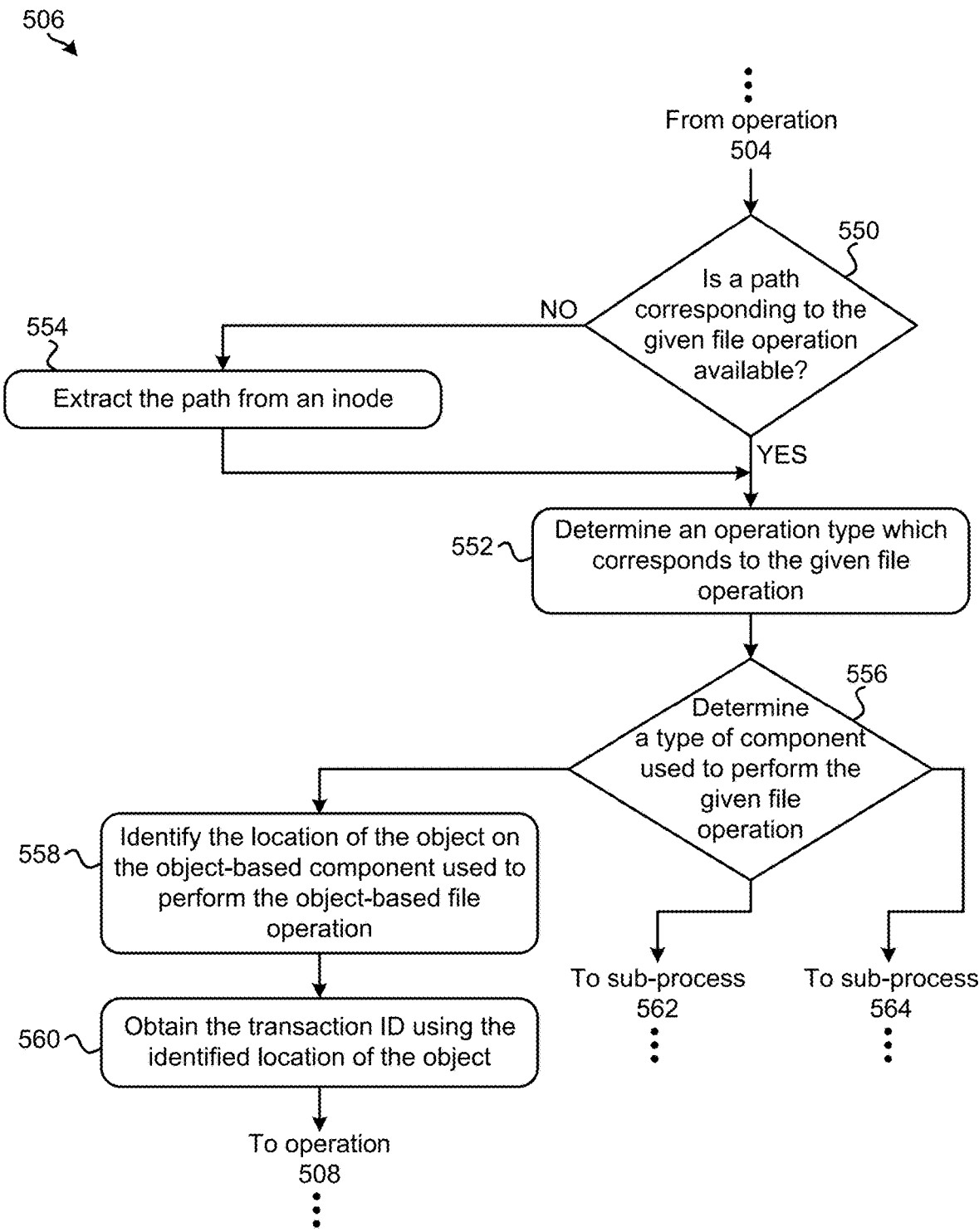
FIG. 5B is a flowchart of sub-processes for one of the operations in the method of FIG. 5A, in accordance with one embodiment.
Figure 5B:
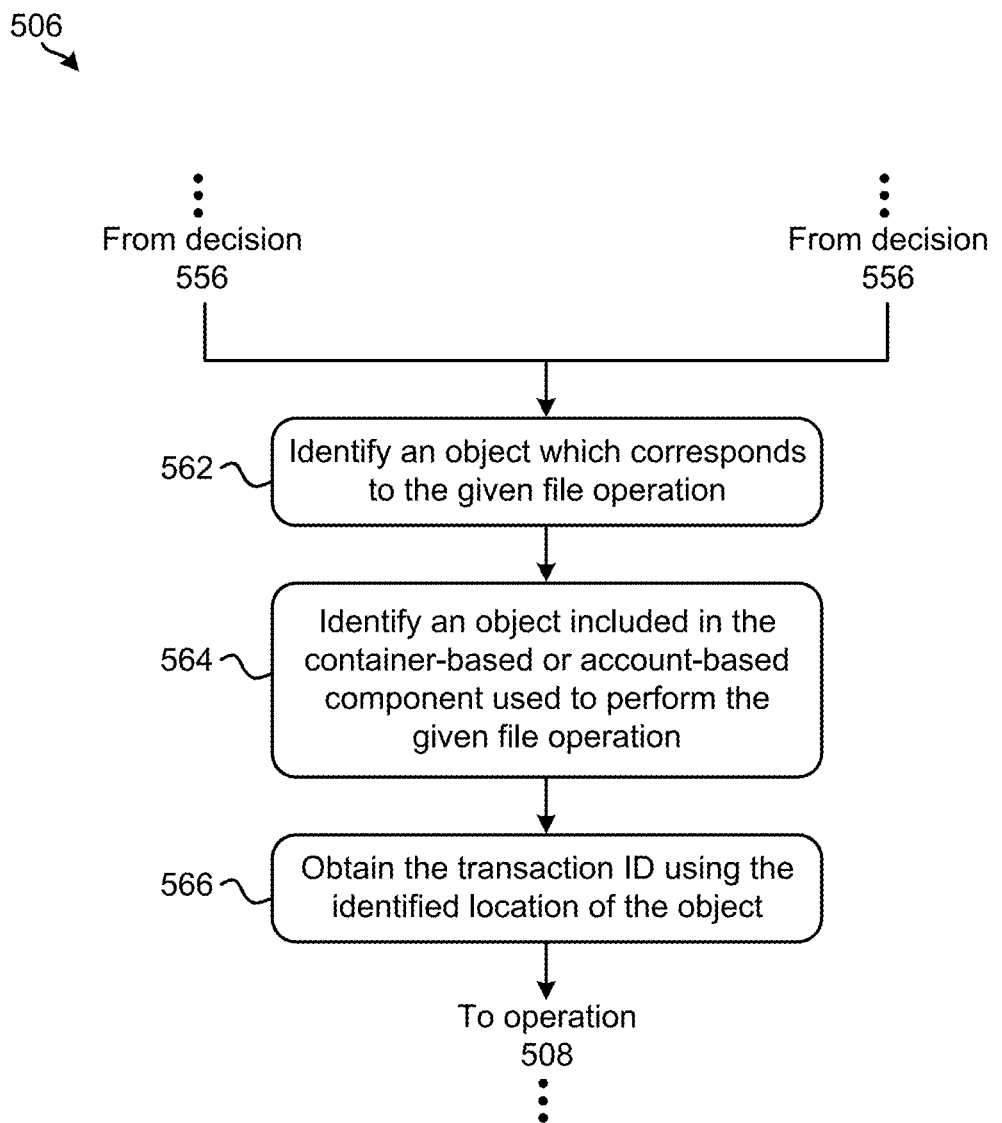

Referring momentarily to FIG. 5B, the various sub-processes included therein may be implemented in order to determine a transaction ID for a given file operation. Accordingly, one or more of the sub-processes included in FIG. 5B may be implemented (e.g., repeated) in order to perform operation 506 of FIG. 5A for each file operation included in the captured snapshot, e.g., as will be described in further detail below. However, in some approaches, the process of determining a transaction ID for a given file operation may include using a modified consistency hashing algorithm.

With continued reference to FIG. 5A, method 500 includes identifying data included in the snapshot which corresponds to completed ones of the sub-operations. See operation 508. In other words, operation 508 includes determining which of the sub-operations have been performed by the one or more processors at node 501. As mentioned above, various types of operations correspond to a specific number and/or order of sub-operations. Thus, the number of sub-operations included in a given file operation is defined in a template which corresponds to a type of the file operation in some approaches. It follows that, by examining a snapshot and evaluating the data included therein, it can be determined which ones of these specific sub-operations have already been performed for each of the object-based operations at a specific location, and which of them have not. According to an example, which is in no way intended to limit the invention, a "PUT" operation involves performing several sub-operations, two of which include creating a temporary file, and writing object content thereto, e.g., as would be appreciated by one skilled in the art after reading the present description. Thus, operation 508 is able to identify that a temporary file has been created at the primary storage location in correspondence with a specific "PUT" object-based operation, but the object content has not yet been written thereto.

Moreover, operation 510 includes using the transaction IDs determined in operation 506 and the data identified in operation 508 to populate entries in a data structure. The data structure preferably remains active such that each of the sub-operations included in the various snapshots captured over time are successfully implemented at a secondary storage location.

Depending on the approach, the data structure may be populated differently. For instance, the manner in which the fields of the data structure are populated may depend on how the data structure is implemented, the type of file operation, a number of sub-operations which correspond to the file operation, etc. In some approaches the fields of the data structure may be populated with information (e.g., data) which corresponds to each of the sub-operations that are performed. For example, sub-operations corresponding to performing a "PUT" file operation may include creating a directory and/or writing object content to a directory. In such an example, the fields of the data structure which correspond to these sub-operations may store directory information and/or storage location information associated with the object content, e.g., as would be appreciated by one skilled in the art after reading the present description. However, in other approaches at least some of the fields of a data structure may include a flag which is set in response to determining that the corresponding sub-operation has been performed.

Once each of the number of fields in the unique queue have been populated (e.g., filled) for a given storage location, it may be determined that each of the sub-operations corresponding to the received file operation have been implemented at the respective storage location, and that the file operation itself has been completed. Thus, the process of updating the data structure to represent whether each of the sub-operations which correspond to each of the file operations are successfully performed allows for the data structure to maintain an accurate representation of both the primary storage location as well as the secondary storage location. This desirably increases reliability, organization, data consistency across storage locations, etc. for a distributed storage system which may be used to implement various ones of the processes included in method 500.

FIG. 5A further includes sending the captured snapshot to a secondary storage location at node 502. See operation 512. As described above, the secondary storage location is remote with respect to the location of the one or more processors at node 501. In some approaches, node 501 serves as an object-based filesystem at a primary storage location while node 502 serves as an object-based filesystem at a secondary storage location which is geographically separated from the primary storage location at node 501. Accordingly, the snapshot is sent to the remote secondary storage location over a network connection (e.g., WAN) which extends therebetween in some approaches. Moreover, node 501

Upon receiving the snapshot, the one or more processors at node 502 use the data included therein to repeat the sub-operations which have already been performed by the one or more processors at node 501. See operation 514. Again, in preferred approaches node 502 serves as a secondary storage location with respect to node 501. Accordingly, data operations performed at node 501 are repeated at node 502 in order to maintain an accurate backup of the data stored in the primary storage location, e.g., as would be appreciated by one skilled in the art after reading the present description. In some approaches, operation 514 is performed by unpacking the data in the received snapshot and replaying (e.g., performing) each of the changes included therein by transaction ID. This may be accomplished by performing a comparison with a populated data structure, e.g., as would be appreciated by one skilled in the art after reading the present description. In other words, operation 514 is performed in some approaches by evaluating the data which is included in the received snapshot and performing the sub-operations which correspond to identified data included in the snapshot. Yet, in other approaches the one or more processors at node 501 mark (e.g., flag) each of the sub-operations included in the snapshot as they are identified in operation 508 such that the one or more processors at node 502 are able to more easily identify and perform the various sub-operations.

As each of the sub-operations are identified and re-performed by the one or more processors at node 502, an acknowledgement is returned to the one or more processors at node 501. See operations 516a-516n. In other words, an acknowledgement is returned to node 501 for each sub-operation once it has been performed. However, one or more acknowledgements can be returned to node 501 according to any desired order, timing convention, structure, etc. For example, in some approaches a first acknowledgement is returned to node 501 upon initiating the performance of an identified sub-operation, and a second acknowledgement is returned to node 501 upon completing the identified sub-operation. In other approaches, a single acknowledgement which indicates (e.g., lists) each of the sub-operations which were performed at the secondary storage location is returned to node 501.

Upon receiving the one or more acknowledgements from node 502 indicating that the sub-operations have been completed (e.g., successfully performed) at the secondary storage location, node 501 includes updating the data structure based on the received acknowledgements. See operation 518. The data structure is updated differently depending on how the acknowledgements are received. For instance, in some approaches the data structure is updated following each acknowledgement received from node 502. In other approaches, node 501 accumulates the acknowledgements received from node 502 in a queue and updates the data structure in response to receiving a final acknowledgement. In still other approaches, a list of each of the sub-operations performed at the secondary storage location is used to update the data structure.

Following operation 518, method 500 includes determining whether any of the completed sub-operations included in the snapshot sent to the secondary storage location were not successfully performed at the secondary storage location. See decision 520. Various circumstances and/or situations may lead to certain sub-operations not being successfully performed at the secondary storage location. For example, in some approaches a data packet which includes a portion of the snapshot can be lost while being transferred to the secondary storage location in operation 512. In other approaches, the secondary storage location is unable to successfully perform the sub-operation at a current point in time despite receiving the data corresponding thereto. It follows that the determination made in decision 520 is performed in some approaches by comparing the sub-operations identified in operation 508 with the acknowledgement(s) received in operations 516a-516n. Accordingly, any discrepancies between the number of sub-operations successfully performed at node 502 and the number of sub-operations identified at node 501 can be used to deduce that not all of the sub-operations were successfully performed at the secondary storage location.

As shown, method 500 proceeds to operation 522 in response to determining that at least one of the completed sub-operations included in the snapshot was not successfully performed at the secondary storage location. In other words, method 500 proceeds to operation 522 in response to determining that at least one of the sub-operations which was successfully performed at the primary storage location was not also successfully performed at the secondary storage location, thereby resulting in a backup which is not fully updated. There, operation 522 includes re-collecting (e.g., re-grouping) data which corresponds to the at least one sub-operation which was successfully completed at the primary storage location, but not at the secondary storage location.

The data re-collected in operation 522 is further re-sent to the secondary storage location at node 502. See operation 524. By re-sending the data corresponding to the one or more sub-operations which were not successfully performed at the secondary storage location, operation 522 allows for the secondary storage location to reattempt performing the one or more sub-operations, e.g., as seen in operation 526. In some approaches the re-collected data is re-sent to node 502 in a subsequent network cycle. However, the data may be re-sent at any time, e.g., depending on the desired approach. Furthermore, node 502 returns one or more acknowledgements in response to successfully performing each of the one or more sub-operations which previously were not successfully performed. See operation 528.

In response to receiving the acknowledgment in operation 528, method 500 is able to determine that each of the sub-operations included in the snapshot has been successfully implemented at the secondary storage location. Accordingly, the flowchart proceeds to operation 530 which includes updating the data structure based on the acknowledgement received in operation 528.

Moreover, operation 532 further includes replicating the data structure to a tertiary storage location (not shown). The tertiary storage location is preferably removed from the primary storage location at node 501, e.g., such that if the primary storage location goes offline, the tertiary location remains accessible, as does the replica of the data structure. It follows that operation 532 is performed in some approaches by sending an updated (current) copy of the data structure to the tertiary storage location, e.g., using a network connection. Moreover, returning to decision 520, it should be noted that method 500 jumps directly to operation 532 in response to determining that all of the completed sub-operations included in the snapshot were successfully performed at the secondary storage location. However, the process of replicating the data structure to a tertiary storage location may be performed at any desired stage of method 500. For instance, in some approaches the data structure may be replicated (or at least updated) to a tertiary storage location in response to performing operation 510.

From operation 532, the flowchart proceeds to operation 534, whereby method 500 may end. However, it should be noted that although method 500 may end upon reaching operation 534, any one or more of the processes included in method 500 may be repeated in order to process additional snapshots of the primary storage location. As mentioned above, it is preferred that a secondary storage location is continually updated over time in order to maintain an accurate replica of the data stored at a primary storage location. Thus, any one or more of the processes included in method 500 may be repeated after a predetermined amount of time has elapsed since a last time method 500 was performed, in response to a predetermined condition being met (e.g., a threshold number of operations being performed at the primary storage location), in response to receiving a request to do so from a user, etc., in order to continue to update the secondary storage location over time.

However, it should be noted that some sub-operations may take additional attempts in order to be completed. In fact, some sub-operations may not be successfully completed at all in some instances. Accordingly, operations 522, 524 and 526 may be repeated any desired number of times in order to successfully implement one or more sub-operations at the secondary storage location. After a certain number of attempts have been made to implement one or more sub-operations at the secondary storage location, the corresponding data may be marked as being outdated and/or corrupt (e.g., according to a permanent failure), a notification may be sent to a user, the one or more sub-operations may be attempted at a yet another storage location, etc., depending on the desired approach.

Looking now to FIG. 5B, exemplary sub-processes of determining a transaction ID which corresponds to a given file operation included in a snapshot are illustrated in accordance with one embodiment, one or more of which may be used to perform operation 506 of FIG. 5A. However, it should be noted that the sub-processes of FIG. 5B are illustrated in accordance with one embodiment which is in no way intended to limit the invention.

The transaction ID for a given file operation may be determined using an operation type, and a path of the file operation. Accordingly, decision 550 includes determining whether a path corresponding to a given one of the file operations in the captured snapshot is available. In some approaches, a path corresponding to the file operation may be received as an input along with the captured snapshot. Thus, in such approaches, the flowchart proceeds directly to sub-process 552 in response to determining that a path corresponding to the given file operation is available. In other words, it may be deduced that upon reaching sub-process 552, a path which corresponds to the given file operation has been determined.

Returning to decision 550, the flowchart proceeds to sub-process 554 in response to determining that a path corresponding to the given file operation is not available. Sub-process 554 includes extracting (e.g., obtaining) the path from an inode which corresponds to the given file operation. According to some approaches, sub-process 554 includes using one or more directory traversal algorithms in combination with the inode in order to extract the path of the given file operation, e.g., as would be appreciated by one skilled in the art after reading the present description.

From sub-process 554, the flowchart proceeds to sub-process 552 which includes determining an operation type which corresponds to the given file operation. For example, a file operation may be an object-based file operation, a container-based file operation, an account-based file operation, etc. Moreover, file operations may have actually been performed using different components depending on the operation type which corresponds thereto. An illustrative list of components which may be used to perform the given file operation includes, but is in no way limited to, one or more servers, a database, one or more data-servers, etc. Thus, by determining an operation type which corresponds to the given file operation, FIG. 5B may be able to further determine the one or more components which may have been used to perform the file operation.

Once sub-process 552 has been performed, the flowchart proceeds to decision 556 which includes determining a type of component used to perform the respective file operation. As mentioned above, the component which was used to perform a given file operation may depend on an operation type which corresponds to the file operation. Thus, decision 556 may be based, at least in part, on the outcome of sub-process 552.

From decision 556, the flowchart is shown as splitting into three possible branches. Each of the possible branches correspond to a different operation type, and therefore a different type of component used to perform the file operation with. It follows that the flowchart may proceed differently depending on the outcome of decision 556. It should also be noted that the number and/or configuration of the possible branches extending from decision 556 are in no way intended to limit the invention. For example, the flowchart may incorporate any number of operation types and/or types of components to perform the file operation with, e.g., depending on the desired approach.

The flowchart proceeds from decision 556 to sub-process 558 in response to determining the given file operation is an object-based file operation (e.g., that the file operation is an "object type"). There, sub-process 558 includes identifying an object included in the object-based component used to perform the file operation. In other words, sub-process 558 includes identifying the location of the object on the object-based component used to perform the object-based file operation.

From sub-process 558, the flowchart proceeds to sub-process 560 which includes obtaining the transaction ID using the identified location of the object. The transaction ID may be obtained from an object log by using the identified location of the object according to some approaches. In other approaches, the transaction ID may be obtained by evaluating an object request associated with the identified location of the object, e.g., as would be appreciated by one skilled in the art after reading the present description.

Returning to decision 556, the flowchart proceeds to sub-process 562 in response to determining that a container-based component was used to perform the given file operation. As mentioned above, this determination may be based on a conclusion that the given file operation is a container-based file operation (e.g., that the file operation is a "container type"), and therefore that a container-based component was used to perform the file operation. Similarly, the flowchart proceeds to sub-process 562 from decision 556 in response to determining that an account-based component was used to perform the given file operation. Again, this determination may be based on a conclusion that the given file operation is an account-based file operation (e.g., that the file operation is an "account type"), and therefore that an account-based component was used to perform the file operation.

Sub-process 562 is depicted as identifying an object which corresponds to the file operation. In other words, sub-process 562 includes identifying a corresponding object which will ultimately cause an update to the data as a result of the file operation being performed. The identified object may further be used to build (e.g., construct) a correlation between the file operation and memory.

Sub-process 564 further includes identifying an object included in the container-based or account-based component (depending on the outcome of decision 556) used to perform the file operation. In other words, sub-process 564 includes identifying the location of the object on the component used to perform the given file operation. The flowchart additionally includes obtaining the transaction ID using the identified location of the object. See sub-process 566. As described above, the transaction ID may be obtained from an object log by using the identified location of the object according to some approaches. In other approaches, the transaction ID may be obtained by evaluating an object request associated with the identified location of the object, e.g., as would be appreciated by one skilled in the art after reading the present description.

Figure 5C:
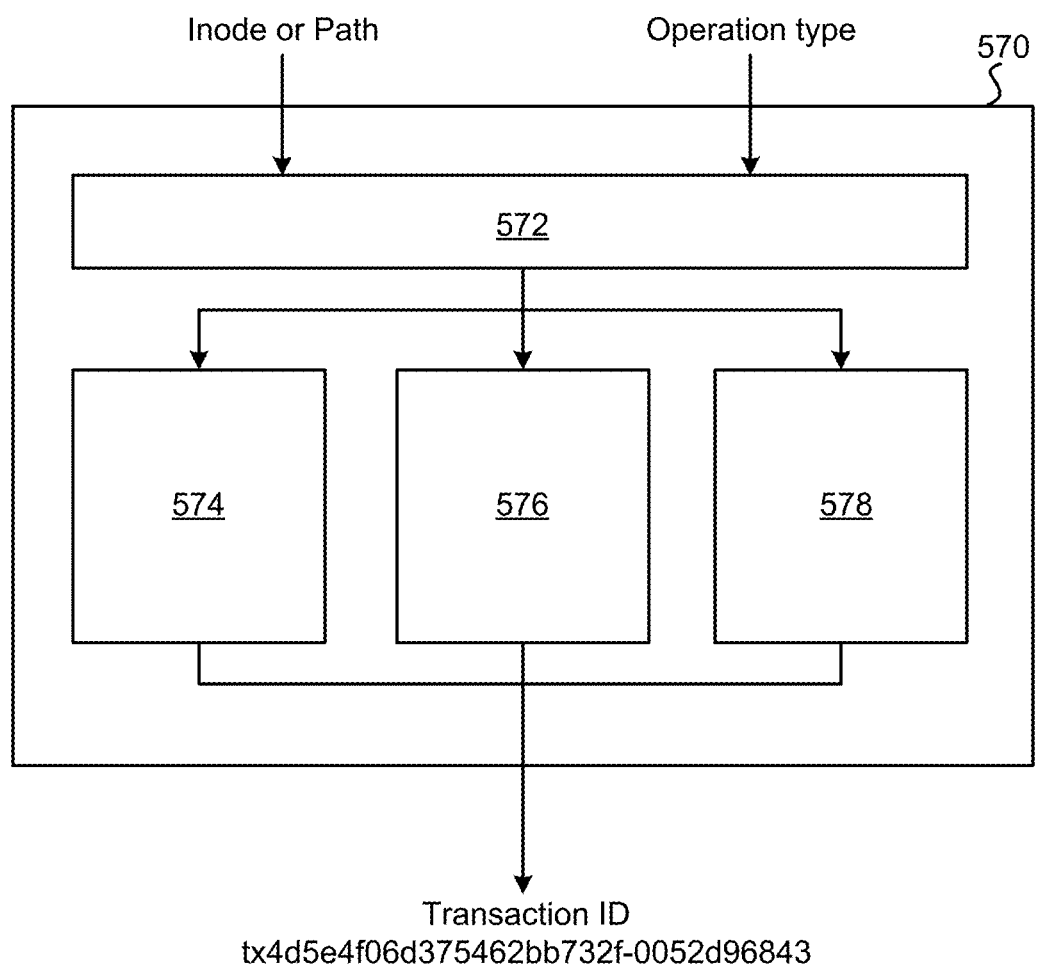
FIG. 5C is a partial representative view of a leveraging placement infrastructure in accordance with one embodiment.

Moreover, FIG. 5C depicts a leveraging placement infrastructure 570 which may be used during the process of determining a transaction ID for a given file operation according to an illustrative embodiment. Accordingly, the leveraging placement infrastructure 570 of FIG. 5C may be used to perform operation 506 of FIG. 5A in some approaches. However, it should be noted that the leveraging placement infrastructure 570 is illustrated in accordance with one embodiment which is in no way intended to limit the invention.

As shown, a path or inode corresponding to a given file operation serves as an input to an exemplary application programming interface (API) 572. An operation type which corresponds to the given file operation serves as a second input for the API 572. The API 572 may be able to convert the information provided in the inputs to data which corresponds to an object transaction ID. Moreover, the API 572 may direct the data to the appropriate component for further performance.

As described above, file operations may actually be performed using different components depending on the type of file operation. The API 572 may therefore direct the information provided in the inputs and/or data derived from the input information to an appropriate one of, the object-based component 574, the container-based component 576, and the account-based component 578, e.g., using any of the approaches described herein. The component may then use the provided information and/or derived data to determine a transaction ID which is then output as a result. An exemplary transaction ID has been illustrated in FIG. 5C which is in no way intended to limit the invention.

As previously mentioned, the type of file operation received may vary depending on the approach. For instance, a file operation may include a "PUT" or "CREATE" command, an "UPDATE" command, a "POST" command, a "DELETE" command, etc. Certain types of file operations may also have predefined templates associated therewith. In other words, a template which specifies a certain number and/or order of sub-operations to be performed for a given object-based operation may be predefined for certain types of file operations that are received. Thus, custom templates which include full lists of sub-operations for each file operation may be implemented depending on the desired approach.

According to an in-use example, which is in no way intended to limit the invention, a file operation which includes a "PUT" command may be received. Accordingly, a provision to feed a custom template may be enabled, the custom template including a full list of sub-operations corresponding to the received file operation. The predefined template corresponding to the received "PUT" command may include the following sub-operations: {'sub-operation 1'-'create tmp directory', 'sub-operation 2'-'create tmp file', 'sub-operation 3'-'write data', 'sub-operation 4'-'rename', 'sub-operation 5'-'write metadata', 'sub-operation 6'-'update container db', 'sub-operation 7'-'update account db'}.

Figure 6:
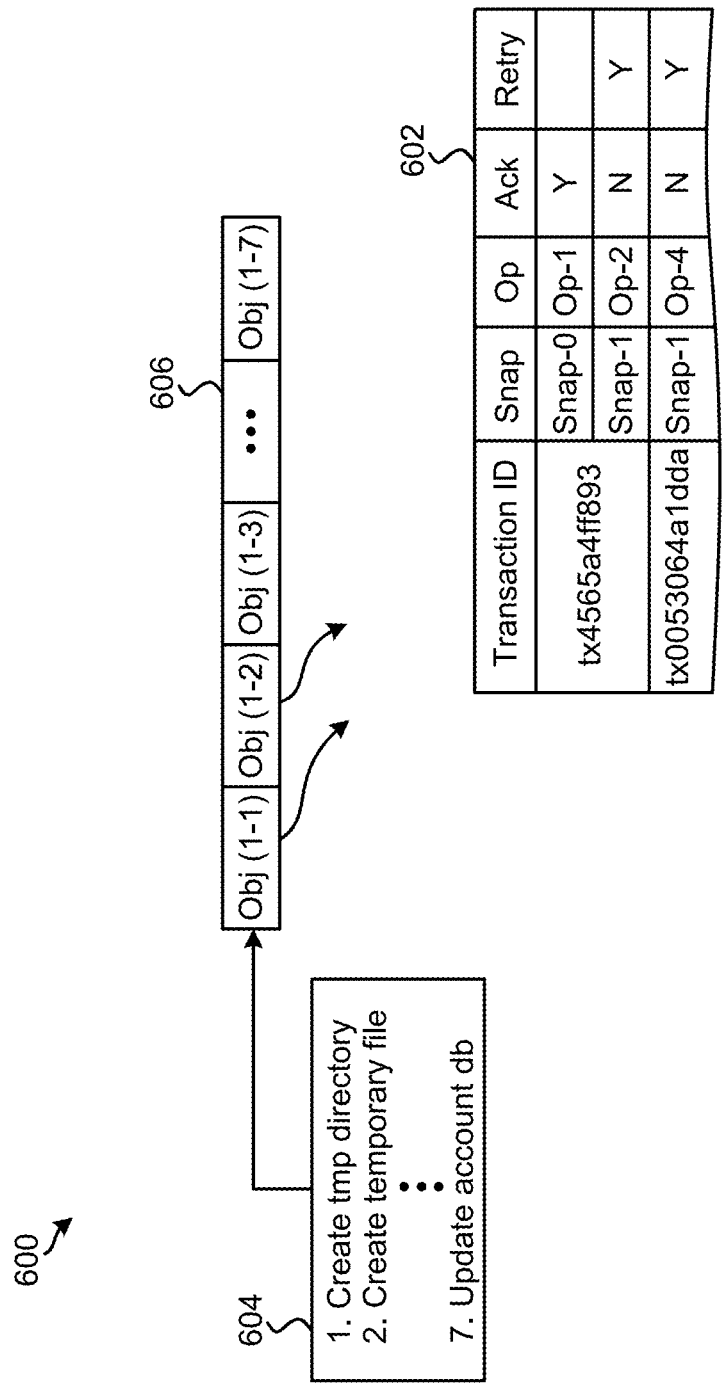
FIG. 6 is a representative view of a unique queue implemented at a remote storage site in accordance with an in-use example.

Referring now to FIG. 6, a data structure 602 implemented by an object-based filesystem at a primary storage site 600 is illustrated according to the present in-use example. Moreover, an exemplary process of populating the data structure 602 is described with respect to file operation details for performing the sub-operations of a "PUT" command according to the present in-use example, which is again in no way intended to limit the invention. Accordingly, a list 604 which includes the various sub-operations of the "PUT" command is shown, as well as a resulting predefined template 606 formed using the list 604. The predefined template 606 is further used to manage the entries in the data structure 602 according to the various approaches described herein.

The data included in each snapshot of the primary storage location is examined in an attempt to identify operations and/or sub-operations corresponding thereto which have been performed at the primary storage location. According to some approaches, the file operations captured in a snapshot are analyzed and a transaction ID which identifies each of these file operations is determined. As shown, a left-most column of the data structure 602 lists the transaction IDs of each of the different operations gleaned from various snapshots, while the next column identifies the snapshot in which data representing the completion of each of the corresponding sub-operations is included. For example, the transaction ID tx0053064a1dda is shown as representing a file operation for which a sub-operation "Op-4" was identified as being included in a received snapshot "Snap-1" of the primary storage location. It should be noted that a remainder of the sub-operations which correspond to the operation represented by transaction ID tx0053064a1dda (e.g., such as "Op-1", "Op-2", and "Op-3") may have been included in previously captured snapshots, and may therefore be found elsewhere in the data structure 602.

The data structure 602 is also shown as including an acknowledgement column which is preferably used to keep track of whether an acknowledgement has been received from a secondary storage location that the respective sub-operation has been successfully performed there. For instance, data structure 602 indicates that sub-operation "Op-1" of an operation identified by transaction ID tx4565a4ff893 has been successfully performed at the secondary storage location by adding a "Y" in the acknowledgement column. Accordingly, no retry of the respective sub-operation is performed.

However, looking to a subsequent sub-operation "Op-2" of the same operation identified by transaction ID tx4565a4ff893, no acknowledgement has been received from the secondary storage location, as indicated by a "N". Accordingly, the "Retry" column includes a "Y" in the respective row which indicates that an attempt to reperform the given sub-operation "Op-2" is to be made (e.g., see operations 522, 524, 526 of FIG. 5A above). However, after a sub-operation has failed a certain number of times (e.g., specified in the system parameters, by a user, based on past performance, etc.), the corresponding data and/or storage location may be marked as being corrupt (e.g., according to a permanent failure), a notification may be sent to a user, the one or more sub-operations may be attempted at a yet another storage location, etc., depending on the desired approach. Accordingly, the "Retry" column may identify sub-operations which are experiencing persistent errors in some approaches.

The data structure 602 is further populated with operations and sub-operations as they are received in various snapshots. Once the data structure 602 has been filled such that an acknowledgement has been received for each of the sub-operations which correspond to a given operation, a determination may be made that the given operation has been fully implemented at the secondary storage location.

It follows that the data structure is maintained by representing each of the file operations captured in snapshots of a primary storage location, with respect to the object state corresponding thereto. Moreover, a replay acknowledgement from a secondary storage location is also enabled for each object.

According to another in-use example, which is in no way intended to limit the invention, one or more sub-operations of a file operation which includes a "DELETE" command may be identified in a snapshot. Accordingly, the data structure may be updated according to a custom template, the custom template including a full list of sub-operations corresponding to the file operation. The predefined template corresponding to the "DELETE" operation may include the following sub-operations: {'sub-operation 1'-'rename', 'sub-operation 2'-'update container db', 'sub-operation 3'-'update account db', 'sub-operation 4'-'delete'}.

The embodiments included herein are able to provision a framework which is able to assist in analyzing the file operations and/or specific sub-operations included in a snapshot, and querying the respective object server to obtain the request transaction ID for each file operation and/or grouping. A data structure is maintained which identifies the file operations captured in various incremental snapshots with respect to the corresponding object states, which are updated for each subsequent snapshot. A replay acknowledgement from the secondary storage location is also enabled for each object, thereby allowing for inconsistencies to be more easily identified.

As a result, a number of significant improvements are achieved for snapshot based disaster recovery approaches; particularly those implemented in conjunction with object workload environments. These improvements include the ability to monitor the file operations captured in incremental snapshots, as well as perform processing per inode in response to determining that any file operations match with sub-operations included in prespecified templates. Moreover, the embodiments herein are able to pass the path and/or inode information on which file operation and operation type has been performed to a server to obtain the object request transaction id as this transaction id is an id which remains unique throughout the object request. Data structures may also be populated with request transaction IDs and/or identified operation phase information.

Typically the first "N" and second "N+1" snapshots are stored at a primary storage location, however the number of snapshots stored at a time is user configurable and depends on network reliability. In situations involving missing acknowledgement which extends for a threshold amount of time, an event is triggered at the primary storage location which collects the missing operations per transaction ID from past stored snapshots. Thus, the data stored in data structures is leveraged is selectively transferred to secondary storage location.

In situations involving permanent failures at the primary storage location, a utility is performed on the populated data structure to collect the transaction IDs which are missing acknowledgements, and the corresponding inodes are marked on the secondary storage location as inconsistent. In some approaches, this marking is performed by appending a new metadata field and/or moving the corrupted inode to "lost+found" region, e.g., as would be appreciated by one skilled in the art after reading the present description.

It follows that various ones of the embodiments included herein are able to provide a framework which improves the process of analyzing file operations, and maintaining an accurate backup of a primary storage location. Further still, the approaches included herein are able to improve the process of implementing sub-operations at a secondary storage location while also marking inconsistencies of objects if any of the sub-operations corresponding to a given file operation are lost, e.g., due to in network issues such as latency. These improvements are able to desirably achieve increased reliability and consistency across storage locations of a distributed storage system which are connected by a network, e.g., such as a WAN. As a result, the system is able to improve data retention by managing the performance of various sub-operations at a secondary storage location, thereby also significantly reducing application downtime and network usage.

These improvements further include the ability to feed custom templates containing full list of file operations per object, container, account operation, etc. According to an example, which is in no way intended to limit the invention, a first template "Template-1" which corresponds to an object PUT operation, includes the following { 'op-1': 'create tmp directory', 'op-2': 'create tmp file', 'op-3': 'write data', 'op-4': 'rename', 'op-5': 'write metadata', 'op-6': 'update container db', 'op-7': 'update account db'}. Another template "Template-2" which corresponds to an object DELETE operation includes {'op-1': 'rename', 'op-2': 'update container db', 'op-3': 'update account db', 'op-4': 'delete'}.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   capturing a snapshot of data stored at a primary storage location;
   determining a transaction identification which corresponds to each file operation included in the snapshot, wherein each file operation includes a respective number of sub-operations;
   identifying data included in the snapshot which corresponds to completed ones of the sub-operations;
   using the determined transaction identifications and the identified data to populate entries in a data structure;
   sending the snapshot to a secondary storage location;
   receiving an acknowledgement from the secondary storage location for each of the completed sub-operations that are successfully performed at the secondary storage location; and
   updating the data structure based on the received acknowledgements.

2. The computer-implemented method of claim 1, comprising:
   determining whether any of the completed sub-operations included in the snapshot were not successfully performed at the secondary storage location;
   in response to determining that at least one of the completed sub-operations included in the snapshot was not successfully performed at the secondary storage location, collecting data which corresponds to the at least one completed sub-operation; and
   sending the collected data to the secondary storage location.

3. The computer-implemented method of claim 1, wherein the number of sub-operations included in a given file operation is defined in a template which corresponds to a type of the file operation.

4. The computer-implemented method of claim 1, comprising:
   replicating the data structure to a tertiary storage location, wherein the tertiary storage location is removed from the primary storage location.

5. The computer-implemented method of claim 1, wherein the operations are performed by a controller coupled to an object-based filesystem at the primary storage location, wherein the secondary storage location includes an object-based filesystem, wherein the primary and secondary storage locations are geographically separated from each other.

6. The computer-implemented method of claim 5, wherein the controller is configured to communicate with the object-based filesystem at the secondary storage location using a wide area network.

7. The computer-implemented method of claim 1, wherein determining a transaction identification which corresponds to a given file operation included in the snapshot includes:
   determining a path which corresponds to the given file operation;
   determining an operation type of the given file operation;
   in response to determining that the operation type of the given file operation is a container type or an account type, identifying a corresponding object;
   identifying a location of the object; and
   obtaining the transaction identification using the identified location of the object.

8. The computer-implemented method of claim 7, comprising:
   in response to determining that the operation type of the given file operation is an object type, identifying the location of the object; and
   obtaining the transaction identification using the identified location of the object.

9. A computer program product comprising a computer readable storage medium having program instructions embodied therewith, wherein the computer readable storage medium is not a transitory signal per se, the program instructions readable and/or executable by a controller to cause the controller to perform a method comprising:
   capturing, by the controller, a snapshot of data stored at a primary storage location;
   determining, by the controller, a transaction identification which corresponds to each file operation included in the snapshot, wherein each file operation includes a respective number of sub-operations;
   identifying, by the controller, data included in the snapshot which corresponds to completed ones of the sub-operations;
   using, by the controller, the determined transaction identifications and the identified data to populate entries in a data structure;
   sending, by the controller, the snapshot to a secondary storage location;
   receiving, by the controller, an acknowledgement from the secondary storage location for each of the completed sub-operations that are successfully performed at the secondary storage location; and
   updating, by the controller, the data structure based on the received acknowledgements.

10. The computer program product of claim 9, the program instructions readable and/or executable by the controller to cause the controller to perform the method comprising:
    determining, by the controller, whether any of the completed sub-operations included in the snapshot were not successfully performed at the secondary storage location;
    in response to determining that at least one of the completed sub-operations included in the snapshot was not successfully performed at the secondary storage location, collecting, by the controller, data which corresponds to the at least one completed sub-operation; and
    sending, by the controller, the collected data to the secondary storage location.

11. The computer program product of claim 9, wherein the number of sub-operations included in a given file operation is defined in a template which corresponds to a type of the file operation.

12. The computer program product of claim 9, the program instructions readable and/or executable by the controller to cause the controller to perform the method comprising:
    replicating, by the controller, the data structure to a tertiary storage location, wherein the tertiary storage location is removed from the primary storage location.

13. The computer program product of claim 9, wherein the controller is coupled to an object-based filesystem at the primary storage location, wherein the secondary storage location includes an object-based filesystem, wherein the primary and secondary storage locations are geographically separated from each other.

14. The computer program product of claim 13, wherein the controller is configured to communicate with the object-based filesystem at the secondary storage location using a wide area network.

15. The computer program product of claim 9, wherein determining a transaction identification which corresponds to a given file operation included in the snapshot includes:
    determining a path which corresponds to the given file operation;
    determining an operation type of the given file operation;
    in response to determining that the operation type of the given file operation is a container type or an account type, identifying a corresponding object;
    identifying a location of the object; and
    obtaining the transaction identification using the identified location of the object.

16. The computer program product of claim 15, the program instructions readable and/or executable by the controller to cause the controller to perform the method comprising:
    in response to determining that the operation type of the given file operation is an object type, identifying, by the controller, the location of the object; and
    obtaining, by the controller, the transaction identification using the identified location of the object.

17. A system, comprising:
    a processor; and
    logic integrated with the processor, executable by the processor, or integrated with and executable by the processor, the logic being configured to:
    capture, by the processor, a snapshot of data stored at a primary storage location;
    determine, by the processor, a transaction identification which corresponds to each file operation included in the snapshot, wherein each file operation includes a respective number of sub-operations;
    identify, by the processor, data included in the snapshot which corresponds to completed ones of the sub-operations;
    use, by the processor, the determined transaction identifications and the identified data to populate entries in a data structure;
    send, by the processor, the snapshot to a secondary storage location;
    receive, by the processor, an acknowledgement from the secondary storage location for each of the completed sub-operations that are successfully performed at the secondary storage location; and
    update, by the processor, the data structure based on the received acknowledgements.

18. The system of claim 17, the logic being configured to:
    determine, by the processor, whether any of the completed sub-operations included in the snapshot were not successfully performed at the secondary storage location;
    in response to determining that at least one of the completed sub-operations included in the snapshot was not successfully performed at the secondary storage location, collect, by the processor, data which corresponds to the at least one completed sub-operation; and
    send, by the processor, the collected data to the secondary storage location, wherein the number of sub-operations included in a given file operation is defined in a template which corresponds to a type of the file operation.

19. The system of claim 17, wherein determining a transaction identification which corresponds to a given file operation included in the snapshot includes:
    determining a path which corresponds to the given file operation;
    determining an operation type of the given file operation;

in response to determining that the operation type of the given file operation is a container type or an account type, identifying a corresponding object;
identifying a location of the object; and
obtaining the transaction identification using the identified location of the object.

20. The system of claim 19, the logic being configured to:
in response to determining that the operation type of the given file operation is an object type, identify, by the processor, the location of the object; and
obtain, by the processor, the transaction identification using the identified location of the object.

\* \* \* \* \*